United States Patent [19]

Schwarz et al.

[11] 4,132,526

[45] Jan. 2, 1979

[54] PROCESS FOR PROTECTING ASBESTOS-CEMENT BEARING SURFACES IN RECIRCULATING COOLING WATER SYSTEMS

[75] Inventors: Richard C. Schwarz, Croyden, Pa.; Bobby G. Chestang, Baton Rouge, La.

[73] Assignee: Betz Laboratories, Inc., Tevose, Pa.

[21] Appl. No.: 741,447

[22] Filed: Nov. 12, 1976

[51] Int. Cl.² ............................................. C23F 11/10
[52] U.S. Cl. .......................................... 422/1; 210/57; 210/58; 422/6
[58] Field of Search ...................... 210/57, 58; 252/87; 252/181; 21/2.7 R, 2.7 A, 58

[56] References Cited

U.S. PATENT DOCUMENTS

| | | | |
|---|---|---|---|
| 3,060,210 | 10/1962 | Groote | 210/58 |
| 3,085,916 | 4/1963 | Zimmie | 210/58 |
| 3,235,324 | 2/1966 | Merriman | 210/58 |
| 3,463,736 | 8/1969 | Booth | 210/58 |
| 3,487,018 | 12/1969 | Troscinski | 252/181 |
| 3,578,589 | 5/1971 | Hwa | 210/58 |
| 3,658,710 | 4/1972 | Puckorius | 210/58 |
| 3,806,451 | 4/1974 | Tate | 210/58 |
| 3,837,803 | 9/1974 | Carter et al. | 252/87 |
| 3,965,028 | 6/1976 | O'Brien | 210/58 |

OTHER PUBLICATIONS

Betz, Handbook of Industrial Water Conditioning, 7th Edition, 1976, 195.

*Primary Examiner*—Frank A. Spear, Jr.
*Assistant Examiner*—Ernest G. Therkorn
*Attorney, Agent, or Firm*—Alexander D. Ricci; Steven H. Markowitz

[57] ABSTRACT

The invention is directed to a method of inhibiting the destructive effect of water in contact with an asbestos-cement containing structure due to the leaching of the water soluble components of the cement, e.g., calcium and magnesium, which comprises the addition to the water of a material which will change the interfacial surface of the cement structure such that the overall solubility of soluble components of the cement will be reduced. The materials which will be suitable for the purpose are water soluble phosphates, water soluble phosphonic acid derivatives, water soluble polymers of acrylic acid, water soluble silicates, and mixtures thereof.

12 Claims, No Drawings

PROCESS FOR PROTECTING ASBESTOS-CEMENT BEARING SURFACES IN RECIRCULATING COOLING WATER SYSTEMS

BACKGROUND OF THE INVENTION

It has been determined that certain structures produced from asbestos and cement, when in continual contact with water, are destroyed over a period of time due to the solubilization of the water soluble constituents of hardened cement, which of course weakens the bonding material. This effect has been of chief concern particularly in those industries which utilize water in great quantities, for example, the cooling water industry. Asbestos-cement compositions have been used to produce boards which are in turn used as fills in cooling water towers. Asbestos-cement fills are being utilized to great extent in the electric utility industry primarily because of economics.

In the past the cooling systems which contain asbestos-cement board fills have experienced problems from standpoints of structure degradation, bowing and softening and ancillary problems resulting to the cooling water train due to the existence of the components of asbestos and cement which have dissolved or broken down and which could, if present in sufficient quantities, deposit on heat transfer surfaces. The overall effect of the deposition thus is to decrease efficiency of the operation, resulting in economic loss.

At the present time, the electric utility industry utilizes corrosion resistant alloys in conjunction with coatings to minimize corrosion. Cooling water velocities are chosen very critically to control deposits. For the most part, no chemical treatments for corrosion or deposition are generally used in this industry. In certain power stations, no chemical treatments are utilized because of environmental restrictions. Accordingly, until the discovery of the present conditions, i.e., degradation of asbestos-cement structures, the electric utility industry required little or no chemical treatment.

GENERAL DESCRIPTION OF THE INVENTION

The present inventors discovered that if certain materials were added to the water contained in systems having structural parts composed of asbestos and cement that the degradation thereof could be minimized, thereby reducing the previously experienced costs incurred for repair and replacement of these structures. The materials which will serve the purpose and which will be described more fully hereafter can be generally described as water soluble organo phosphonic acid derivatives, water soluble organic and inorganic phosphates, including esters thereof, water soluble polymers of acrylic acid, and water soluble silicates, and mixtures thereof. These materials act to change the interfacial surface of the asbestos-cement structures such that the overall solubility of the components of the cement is reduced. Although the inventors do not intend to limit their invention to the following explanation, they believe that there is a reaction with the soluble ions, namely calcium and magnesium, of the cement to produce a reaction product which is not soluble in water, in essence protecting the interfacial surface.

The materials generally may be added in an amount of 0.1 to 10,000, and preferably from about 1 to 100, parts per million parts of water in the system. The treatment will be most effective if water in the system is maintained or adjusted with either base or acid to a pH of 6 to 10, and maintained at a positive Langelier (see *Betz Handbook of Industrial Water Conditioning*, 6th Edition, 1962, Betz Laboratories, Inc., Trevose, Pa., pages 230–231).

The materials which are to be utilized in accordance with the present invention are as follows:

The organo phosphonic acid compounds (including water soluble salts) which may be used in accordance with the present invention are those which are named and described structurally in U.S. Pat. No. 3,837,803. Generally these may be described as organo mono or poly phosphonic acid compounds having a carbon to phosphorus bond depicted as

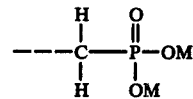

where M is a water soluble cation, e.g., H, Na, K, $NH_4$. The phosphonates may be either amine or non-amine containing compounds.

The organo phosphonic acid compounds of particular significance for the present purposes are:

1. amino-tri (methylene phosphonic acid) or water soluble salt thereof

2. 1-hydroxy ethylidene diphosphonic acid or water soluble salt thereof

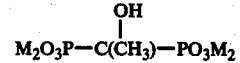

3. hexamethylene diamine tetra (methylene phosphonic acid)

The inorganic phosphates which can be utilized in accordance with the invention may be ortho phosphates as described in U.S. Pat. No. 3,837,803, i.e., mono, di or tri alkali metal phosphates, including ammonium phosphates. The polyphosphates are basically the alkali metal poly phosphates, e.g., sodium hexametaphosphate, sodium pyrophosphate, sodium tripolyphosphate, etc.

The organic phosphates which are utilizable in accordance with the present invention are those which are described in U.S. Pat. No. 3,487,018, which is directed to polyoxylated polyhydric compounds esterified with a phosphoric acid, e.g., polyphosphoric acid or phosphorous pentoxide. The polyoxyalkylated polyhydroxy which are reacted as above described have the formula

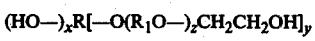

wherein R is a saturated hydrocarbon radical having 3–6 carbon atoms, $R_1$ is a member selected from the group consisting of $—CH_2CH_2—$ and

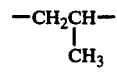

$x$ is a number average in the range of 0-5 inclusive, $y$ is a number average in the range of 1-6 inclusive, and the sum of $x$ plus $y$ equals 3-6, and $z$ is a number average in the range of 0-3 inclusive, said phosphated polyhydroxy compositions having an average of at least one and up to all of the hydroxyls of the 2-hydroxyethyl groups and on an average of zero up to substantially all of said hydroxyl groups directly attached to the radical R replaced by phosphate ester groups, said phosphate ester groups consisting essentially of one or both of a member selected from the group consisting of

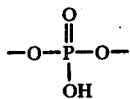

and

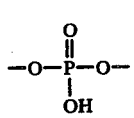

Specific starting polyhydroxy compounds may be obtained by oxyalkylating polyhydric compounds such as glycerine, mannitol, sorbitol and the like.

Other organo phosphates which are applicable are also phosphate esters having the formula

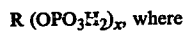

R is the hydrocarbyl group of a polyhydric alcohol and $x$ is from 2 to 6.

In addition to the foregoing, alkali metal silicates, e.g., sodium and potassium silicates, are suitable as well as polymers having a major proportion of acrylic acid derived moieties. The polymers should be water soluble. Sodium polyacrylates having molecular weights of 500 to 40,000 are exemplary of this material. Sodium polyacrylate of molecular weight of 2,000 has been proven to be quite successful.

In order to establish the efficacy of the instant invention, certain tests as described below were performed.

Test procedure: The test procedure consisted of immersion of "ACB" (asbestos-cement or concrete board) tower fill samples into a 1,000 ml beaker. This beaker was fitted with a water cooled condenser, thermometer, and a sparger for aeration of the test solution. The beaker was placed on a stirrer-hot plate and a magnetic stirring bar was added. The temperature was manually controlled to 120° F. Test duration was for 14 days. Samples of the fill material were rinsed with water and dried at 130° F. for 8-12 hours. Samples were then air-cooled and weight recorded to the nearest milligram. Upon completion of the testing, a similar sample handling technique was used. Test solutions were prepared by addition of calcium chloride, magnesium sulfate, sodium sulfate and sodium bicarbonate, and NACl to deionized water. During treatment evalution, the treatment chemical was added also. pH of the test solution was adjusted and testing commenced with sample immersion. pH readjustment was made every 3-4 days. Weight loss data obtained during this testing is shown as follows:

|  | No Treatment | 50 ppm Treatment |
|---|---|---|
|  | Weight loss (mgm) | |
| pH 6 | 2387 | 1081 |
| pH 7 | 2154 | 1122 |

|  | No Treatment | 50 ppm Treatment |
|---|---|---|
|  | Weight loss (mgm) | |
| pH 8 | 2038 | 927 |

The results show that an increase in pH and overall Langelier Saturation Index have beneficial effect. Addition of treatment gives an overall enhanced effect.

The treatment utilized in the above tests was a combination treatment composed as follows:

| 1. Full sodium salt of amino tri (methylene phosphonic acid) | |
|---|---|
| $N(CH_2PO_3H_2)_3$ | 6.0% |
| 2. Sodium polyacrylate (M.W. approx. 2,000) | 12.5% |
| 3. Sodium hydroxide | 12.5% |
| 4. Water | 69.0% |
| The synthetic water had the following analysis (approximately): | |
| total hardness as $CaCO_3$ | 300 ppm |
| Ca as $CaCO_3$ | 40 ppm |
| Mg as $CaCO_3$ | 260 ppm |
| chloride | 480 ppm |
| conductivity | 1500μmhos |

For a comparison study a calcium "rich" cooling water of the following approximate composition was prepared:

| total hardness as $CaCO_3$ | 300 ppm |
|---|---|
| calcium as $CaCO_3$ | 170 ppm |
| Mg as $CaCO_3$ | 130 ppm |
| chloride | 104 ppm |
| conductivity | 600μmhos |

The following data were generated:

|  | Weight loss (mgm) |
|---|---|
| pH 6.0 | 848 |
| pH 8.0 | 871 |

If these results are compared to those of the synthetic water, the overall effect of calcium saturation (Langelier Index) can be reflected:

|  | Weight loss data | |
|---|---|---|
|  | Synthetic $H_2O$ | Calcium Rich $H_2O$ |
| pH 6.0 | 2387 | 848 |
| pH 8.0 | 2038 | 871 |

Field Evaluation

To assess whether the invention had merit under actual operating conditions, a field evalution was conducted at an electric power company. The system comprises a 500 mw coal-fired boiler producing steam to drive a condensing turbine. The turbine exhausts to a condenser. Steam is condensed by removing the latent heat of vaporization in a surface condenser. The latent heat is rejected to a recirculating cooling system which has four pumps, two conduits and a mechanical draft cooling tower constructed of reinforced concrete and filled with asbestos-cement board (ACB).

The makeup to the recirculating cooling water system is usually maintained at 7.0 pH or lower. It usually has a Langelier Index which is negative.

50% sodium hydroxide was used to elevate the makeup water pH and as a result the circulating water pH was also elevated. The treatment described in the test procedures was fed continuously to the circulating water to maintain a concentration of 20 ppm.

Prior to the inititation of the feed of NaOH and the treatment (approximately 9 months time), softening, loss of ACB fill weight, and fill member bowing were observed, causing considerable concern. Operating personnel, after a short period of time, indicated that the treatment noticeably reduced ACB degradation with softening and bowing thereof abated.

In view of the foregoing, it is apparent that the invention was successful in controlling what was considered to be a very serious problem.

What is claimed is:

1. A method of inhibiting the destructive effect of cooling water on asbestos-cement components of a cooling water system which comprises concurrently adjusting and/or maintaining the cooling water in said system at a pH of 6 to 10 so as to provide a positive Langelier saturation and adding to the water a sufficient amount for the purpose of a material selected from the group consisting of water soluble phosphonic acid compounds, water soluble phosphate compounds, water soluble acrylic polymers, water soluble silicates, and mixtures thereof.

2. A method according to claim 1, wherein the asbestos-cement components are the fills of a cooling tower.

3. A method according to claim 2, wherein the material is a combination of an organo phosphonate having a $-CH_2-PO_3M_2$, wherein M is H, alkali metal, or $NH_4$, and a water soluble polymer of an acrylic acid or water soluble salt thereof.

4. A method according to claim 3 wherein the organic phosphonate is amino tri (methylene phosphonic acid) or its water soluble salt and the polymer is sodium polyacrylate having a molecular weight of 500 to 40,000.

5. A method according to claim 1, wherein the material is added in an amount of from about 1 to 100 parts per million parts of water in the system.

6. A method in accordance with claim 5, wherein the material added is a water soluble organo phosphonic acid or water soluble salt thereof having the grouping $-CH_2-PO_3M_2$, wherein M is H, alkali metal or ammonium cation.

7. A method according to claim 6 wherein the organo phosphonic acid compound is selected from the group of
   amino tri (methylene phosphonic acid) and water soluble salts thereof;
   1-hydroxy ethylidene diphosphonic acid and water soluble salts thereof; and
   hexamethylene diamine tetramethylene phosphonic acid.

8. A method according to claim 5 wherein the material is a water soluble organic or inorganic phosphate compound.

9. A method according to claim 5 wherein the material is a water soluble acrylic acid polymer having a molecular weight of from about 1000 to 40,000.

10. A method according to claim 5 wherein the material is a water soluble alkali metal silicate.

11. A method according to claim 5 wherein the material is a combination of an organo phosphonate having a $-CH_2-PO_3M_2$, wherein M is H, alkali metal, or $NH_4$, and a water soluble polymer of an acrylic acid or water soluble salt thereof.

12. A method according to claim 11 wherein the organic phosphonate is amino tri (methylene phosphonic acid) or its water soluble salt and the polymer is sodium polyacrylate having a molecular weight of 500 to 40,000.

* * * * *